United States Patent
Chatterjee et al.

(10) Patent No.: US 10,318,636 B2
(45) Date of Patent: *Jun. 11, 2019

(54) METHOD AND SYSTEM FOR DETERMINING ACTION ITEMS USING NEURAL NETWORKS FROM KNOWLEDGE BASE FOR EXECUTION OF OPERATIONS

(71) Applicant: Wipro Limited, Bangalore (IN)

(72) Inventors: Arindam Chatterjee, Chandannagar (IN); Debanjan Chaudhuri, Kolkata (IN); Anasuya Devi Kompella, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

This patent is subject to a terminal disclaimer.

(21) Appl. No.: 15/372,020

(22) Filed: Dec. 7, 2016

(65) Prior Publication Data

US 2018/0121418 A1    May 3, 2018

(30) Foreign Application Priority Data

Oct. 30, 2016 (IN) .............................. 201641037194

(51) Int. Cl.
   *G06F 17/27*    (2006.01)
   *G06F 17/30*    (2006.01)
   *G06F 17/21*    (2006.01)

(52) U.S. Cl.
   CPC ........ *G06F 17/2785* (2013.01); *G06F 17/218* (2013.01); *G06F 17/271* (2013.01); *G06F 17/274* (2013.01); *G06F 17/2705* (2013.01)

(58) Field of Classification Search
   CPC . G06F 17/2705; G06F 17/30864; G06F 17/30
   USPC .......................................................... 707/5
   See application file for complete search history.

(56) References Cited

U.S. PATENT DOCUMENTS

| 9,053,423 | B2 | 6/2015 | Proux |
| 9,495,352 | B1* | 11/2016 | Smyros ............... G06F 17/2705 |
| 2008/0313167 | A1* | 12/2008 | Anderson ......... G06F 17/30864 |

OTHER PUBLICATIONS

Zhang et al., "Automatically Extracting Procedural Knowledge From Instructional Texts Using Natural Language Processing", pp. 1-8, 2012.

* cited by examiner

*Primary Examiner* — Farzad Kazeminezhad
(74) *Attorney, Agent, or Firm* — Pepper Hamilton LLP

(57) ABSTRACT

Systems and methods for determining action items from knowledge base for execution of operation. The system receives instructions, present in a knowledge base, which are required to execute one or more operations. Thereafter, the system parses the instructions into one or more sentences and assigns a POS tag for each word in the one or more sentences. Further, the system assigns a predefined class for each of the POS tagged word. Based on the predefined class, the system determines the action items. The action item comprises one or more actions and one or more components on which the one or more actions are to be performed. The present disclosure enables automated systems to easily execute one or more operation based on the action items thereby reducing the delay in performance of the automated system due to complexity in interpreting the instructions.

18 Claims, 4 Drawing Sheets

METHOD AND SYSTEM FOR DETERMINING ACTION ITEMS USING NEURAL NETWORKS FROM KNOWLEDGE BASE FOR EXECUTION OF OPERATIONS

This application claims the benefit of Indian Patent Application Serial No. 201641037194 filed Oct. 30, 2016, which is hereby incorporated by reference in its entirety.

FIELD

The present disclosure relates in general to artificial intelligence. More particularly, but not exclusively, the present disclosure discloses a method and system for determining action items from knowledge base for execution of operations.

BACKGROUND

Nowadays, intelligent systems or automated systems are faster and dependable efficient alternatives to human resources for automating tasks. Intelligent Systems are requisite for companies that intend to thrive in Information Technology field. The intelligent systems are dependent on knowledge base, including, but are not limited to, user manuals, troubleshooting guides, instruction manuals which consist of instructions for automating the tasks. But the documents incorporate numerous lines of natural language texts that relay sets of instructions, and such resources are not utilizable in that very format by the intelligent system to automate the tasks. Furthermore, huge amount of human effort is required for reading, comprehending, grasping the natural language texts and then actuating the same on the intelligent system.

So much of effort goes in understanding small set of instructions, which if well formulated, can be easily interpreted and simulated by the intelligent system. Consider an exemplary natural language instruction taken from a manual in the knowledge base which is: "Remove the battery from the battery compartment. Press and hold the Power button to drain residual electrical charge from the capacitors that protect the memory". This instruction may be condensed and translated into two simple instruction sets as given below:
1. Remove->Battery
2. Press and Hold->Power button These instructions are easy to interpret both for a human as well as the intelligent system. But, it would be highly beneficial to have a system that converts and translates the umpteen number of natural language instructions in the user manuals, troubleshooting guides and similar documents to instruction sets that can be easily understood and executed by the intelligent system.

Currently, existing systems that address the above mentioned problems are majorly based on identifying part-of-speech tags of the natural language texts. Since part-of-speech extraction is not accurate, these systems do not scale above the accuracy of the Part-Of-Speech taggers. Besides, these systems are domain dependent and do not fare well across domains as they do not learn domain specific features automatically to interpret the instructions.

SUMMARY

The present disclosure relates to a method for determining action items from knowledge base for execution of operations. The method comprises the steps of receiving, by an action item determination system, one or more instructions present in a knowledge base associated with the action item determination system, wherein the one or more instructions are required to execute one or more operations. Each of the one or more instructions are parsed into one or more sentences. The method further comprises assigning a Part of Speech (POS) tag for each word in the one or more sentences and thereafter assigning a predefined class for each POS tagged word in the one or more sentences based on one or more predefined parameters. Upon assigning the class for each POS tagged word, the method further determines action items in each of the one or more sentences based on the predefined class for executing the one or more operations.

Further, the present disclosure relates to an action item determination system for determining action items for executing one or more operations. The action item determination system comprises a processor and a memory communicatively coupled to the processor. The memory stores processor-executable instructions, which, on execution, causes the processor to receive one or more instructions, present in a knowledge base associated with the action item determination system, required to execute one or more operations. Further, the system parses each of the one or more instructions into one or more sentences. Thereafter, the system assigns a Part of Speech (POS) tag for each word in the one or more sentences and also assigns a predefined class for each POS tagged word in the one or more sentences based on one or more predefined parameters. Finally, the system determines action items in each of the one or more sentences based on the predefined class for executing the one or more operations.

Further, the present disclosure comprises a non-transitory computer readable medium including instructions stored thereon that when processed by at least one processor causes an action item determination system to perform operations comprising receiving one or more instructions present in a knowledge base associated with the action item determination system, wherein the one or more instructions are required to execute one or more operations. The instructions further cause the processor to parse each of the one or more instructions into one or more sentences. Upon parsing each of the one or more instructions, the instructions further cause the processor to assign a Part of Speech (POS) tag for each word in the one or more sentences. Further, the instructions cause the processor to assign a predefined class for each POS tagged word in the one or more sentences based on one or more predefined parameters. Finally, the instructions cause the processor to determine action items in each of the one or more sentences based on the predefined class for executing the one or more operations.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
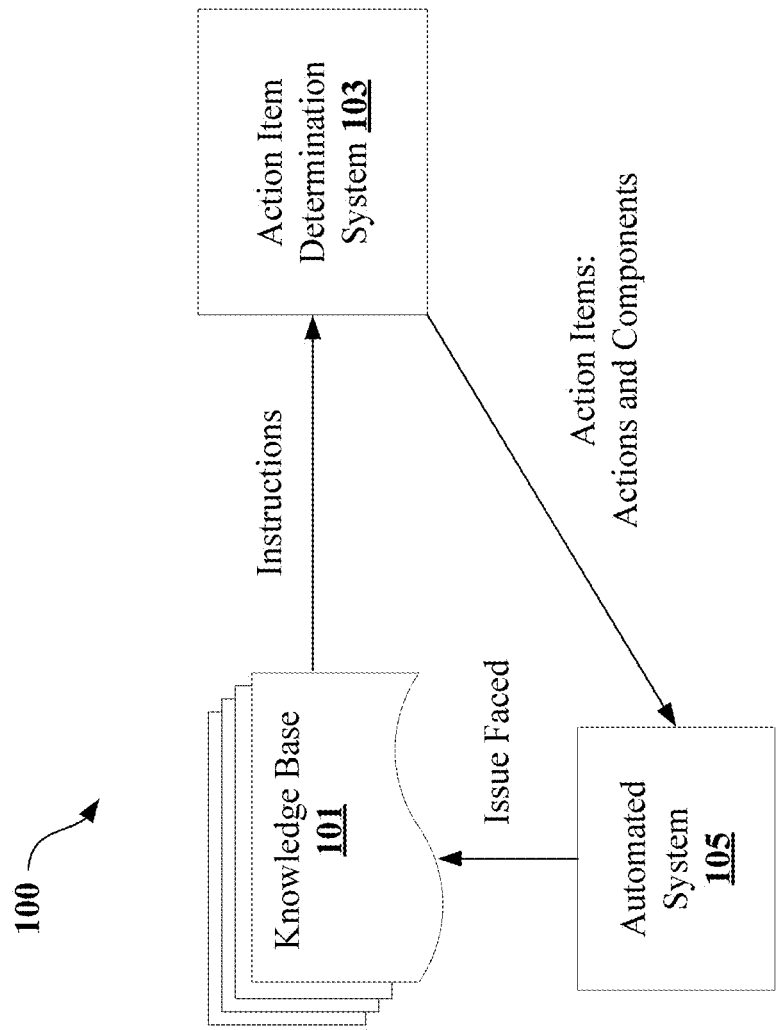
FIG. 1 shows an exemplary environment illustrating an action item determination system for determining action items in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and an action item determination system (alternatively also referred as "system" or "action item determination computing device") for execution of one or more operations. Although, the method for determining the action items is described in conjunction with a server, the method can also be implemented in various computing systems/devices, other than the server. The method is implemented in order to enable any intelligent system to easily interpret the instructions for executing one or more operations.

The method not just focuses on assigning a Part of Speech (POS) tag for each word in the instructions but also assigns a class for each word in the instructions. The class comprises one of "action, begin component, inside component and others. The class is assigned based on the POS tag attached for each word and also based on word embedding of the word. The word embedding takes care of syntactic and semantic features of the word in the context i.e the arrangement of the words and meaning of the word in the context. Based on the class, the action items such as one or more actions and the one or more components on which the one or more actions are to be performed are determined. By this, the intelligent systems can easily interpret the actions items and would be able to execute the one or more operations using the action items.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment illustrating an action item determination system for determining action items in accordance with some embodiments of the present disclosure.

The exemplary environment 100 comprises a knowledge base 101, an action item determination system 103 and an automated system 105. The automated system 105 may be any intelligent system capable of executing one or more operations based on one or more instructions. In an embodiment, the automated system 105 may include, but not limited to, a computer, a workstation, a laptop, mobile phone, or any computing system/device capable of receiving, analysing and performing the one or more operations. In an embodiment, the action item determination system 103 may be implemented in the automated system 105. The knowledge base is a set of documents in the form of user manual or data guides. The document may contain sequence of issues and corresponding solutions. The data is collected from several domains by using document parsing techniques, for example PDF and HTML parsing techniques. In an embodiment, the knowledge base may be made available in the automated system 105. As an example, the automated system 105 may encounter an issue. The automated system 105 may search in the knowledge base for one or more resolutions (also referred as solutions) for the issue. The one or more solutions are the instructions for the automated system 105 to overcome the issue. The instructions may be in the format of natural text.

The action item determination system 103 associated with the automated system 105 receives the instructions present in the knowledge base. The system 103 parses the instructions into one or more steps and each step is passed for further processing. The system parses (segments) each step into one or more sentences wherein each sentence comprises one or more words. The system 103 assigns a Part of Speech (POS) tag for each word in the one or more sentences. Thereafter, the system 103 assigns a predefined class for each POS tagged word in the one or more sentences. The predefined class is identified for each word in the knowledge base. The predefined class is identified based on the POS tag and word embedding for the word. The word embedding indicates the syntactic and semantic features of the word in the context. The predefined class is one of "action", "begin component", "inside component" and "others". The class "action" indicates the action to be performed in the received instruction. The class "begin component" and "inside component" indicates the components in the instructions on which the actions are to be performed. The system 103 determines the action items comprising one or more actions and one or more corresponding components based on the predefined class. Once the action items are determined, the actions items are provided to the automated system 105. The automated system 105 may execute one or more operations based on the action items.

Figure 2:
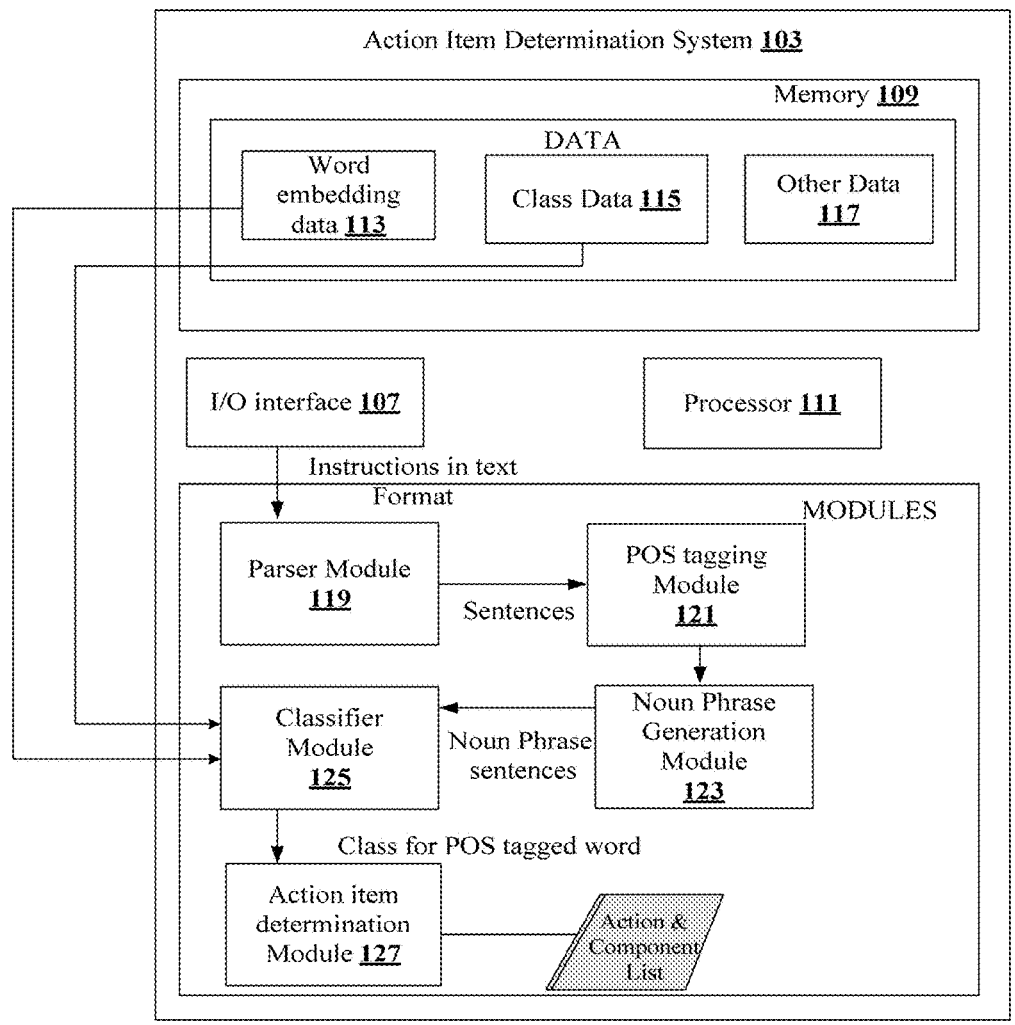
FIG. 2 shows a detailed block diagram illustrating the action item determination system in accordance with some embodiments of the present disclosure.

FIG. 2 shows a detailed block diagram illustrating the action item determination system in accordance with some embodiments of the present disclosure.

The action item determination system 103 comprises an I/O interface 107, a memory 109 and a processor 111. Memory 109 is communicatively coupled to the processor 111. The processor 111 is configured to perform one or more functions of the action item determination system 103 for determining action items. In one implementation, the action item determination system 103 comprises data and modules for performing various operations in accordance with the embodiments of the present disclosure. In an embodiment, the data may include, without limitation word embedding data 113, classifier data 115 and other data 117.

In an embodiment, the word embedding data 113 indicates syntactic and semantic features of the word in the context. To compute the word embedding, data from various domains may be used. For example, the instruction may contain a word "laptop" and the system 103 may identify the word as a component based on the process that is explained in detail in the below description. If the system 103 encounters another instruction in which the word "notebook" has been used, the system 103 may identify this word as the component itself, since the word embedding for both these words are the same and may appear in similar contexts in the knowledge base. The word embedding may be obtained using neural network techniques by the system 103.

In an embodiment, the class data 115 comprises data of a class associated with each word in the knowledge base. The class comprises one of "action", "begin component", "inside component", and "others". To assign the class for each word, one domain of the knowledge base is manually tagged and these tags are required to understand the role of the word in the context. Further, the class is assigned based on below mentioned parameters namely, POS tag of a target word represented as $(X_i)$ POS tag of two words prior to the target word represented as $(X_{i-2}, X_{i-1})$ Word embedding of the target word, represented as $(W_i)$ Based on the above, for a word with POS tag $x_i$, the POS tags of the previous two words are concatenated. Hence, each word will have a vector, $(x_{i-2}, x_{i-1}, x_i)$.

In some embodiment, different domains of the word have to be considered in order to identify the vector of the word, the word embedding is considered before assigning a class. Therefore, if the word embedding of the target word indicates Wi, then the input vector of each word in the knowledge base would be represented as mentioned below.

$$(x_{i-2}, x_{i-1}, x_i, W_i) \quad (1)$$

In an embodiment, the input vector is provided to a neural network classifier with Rectified Linear Unit (RELU) activation units. The neural network classifier would assign a class for each word based on the POS tag of the target word, POS tag of two words prior to the target word and word embedding of the target word.

As an example, consider the below mentioned sentence for which a class has to be assigned.

Sentence—"Remove the memory module compartment cover" The class identified for each word are shown below:
Remove—Action (A)
the—Other (O)
memory—Begin Component (BC)
module—Inside Component (IC)
compartment—Inside Component (IC)
cover—Inside Component (IC)
"Remove_A the_O memory_B-C module_I-C compartment_I-C cover_I-C"

In one embodiment, the data may be stored within the memory 109 in the form of various data structures. Additionally, the aforementioned data can be organized using data models, such as relational or hierarchical data models. The other data 117 may store data, including temporary data and temporary files, generated by modules for performing the various functions of the action item determination system 103.

In an embodiment, the data may be processed by one or more modules. In one implementation, the one or more modules may also be stored as a part of the processor 111. In an example, the one or more modules may be communicatively coupled to the processor 111 for performing one or more functions of the action item determination system 103.

In one implementation, the one or more modules may include, without limitation, a parsing module 119, POS tagging module 121, noun phrase generation module 123, classifier module 125, action item determining module 127 and other modules. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In some embodiments, the parser module 119 receives the instructions from the knowledge base and parses the instructions into one or more steps. Thereafter, the parser module 119 parses the one or more steps into one or more sentences.

As an example, the automated system 105 may have encountered an issue. The issue may be related to electrical charge draining from a laptop battery. The instructions or the resolutions provided in the knowledge base for the aforementioned issue are: Shut down the laptop and remove the battery, press and hold the power button to drain residual electrical charge from the capacitors that protect the memory, insert the battery, and turn on the laptop.

The parser module 119 parses the abovementioned instructions into one or more steps as mentioned below.

1. Shut down the laptop and remove the battery
2. Press and hold the power button to drain residual electrical charge from the capacitors that protect the memory
3. Insert the battery. Turn on the laptop.

Further, the parser module 119 parses the one or more steps into one or more sentences, wherein each sentence comprises plurality of words as shown below.

1) Shut down the laptop and remove the battery
2) Press and hold the power button to drain residual electrical charge from the capacitors that protect the memory
3) Insert the battery. Turn on the laptop.

In an embodiment, the POS tagging module 121 tags each word in the one or more sentences with a Part of Speech (POS) as shown below. The POS tag for each word is indicated adjacent to the word in each of the one or more sentences.

1. Shut_VB down_PP the_DT laptop_NN and_CC remove_VB the_DT battery_NN
2. Press_VB and_CC hold_VB the_DT power_NN button_NN to_PP drain_VB residual_JJ electrical_JJ charge_NN from_PP the_DT capacitors_NNS that_DT protect_VB the_DT memory_NN
3. Insert_VB the_DT battery_NN
4. Turn_VB on_PP the_DT laptop_NN Wherein, VB is Verb, N is Noun, JJ is Adjective, DT is Determinant, NNS is Noun (plural), PP is Preposition, CC is Conjunction.

In an embodiment, the noun phrase generation module 123 further parses each of the POS tagged word in the one or more sentences to generate one or more noun phrases based on regular expression grammar. The noun phrase contains a noun and a function in the sentence. Each sentence is further parsed to identify one or more noun phrases in the sentence as shown below.

1. Shut_VB down_PP the_DT laptop_NN and_CC remove_VB the_DT battery_NN
The generated Noun Phrases are:
a) Shut_VB down_PP the_DT laptop_NN
b) remove_VB the_DT battery_NN
2. Press_VB and_CC hold_VB the_DT power_NN button_NN to_PP drain_VB residual_JJ electrical_JJ charge_NN from_PP the_DT capacitors_NNS that_DT protect_VB the_DT memory_NN
The generated Noun Phrase is:
a) Press_VB and_CC hold_VB the_DT power_NN button_NN
3. Insert_VB the_DT battery_NN
The generated Noun Phrase is:
a) Insert_VB the_DT battery_NN
4. Turn_VB on_PP the_DT laptop_NN
The generated Noun Phrase is:
a) Turn_VB on_PP the_DT laptop_NN In an embodiment, the classifier module 125 considers POS tags and word embedding of words as features and assigns a class to each POS tagged word as explained below with the example.

1. Shut_VB down_PP the_DT laptop_NN and_CC remove_VB the_DT battery_NN
The generated Noun Phrases are:
a) Shut_VB down_PP the_DT laptop_NN
b) remove_VB the_DT battery_NN
The output from the classifier module 125 is as shown below, wherein the class is indicated adjacent to each word in the POS tagged words in the sentence: Shut_A down_A the_O laptop_BC The word "shut" is assigned with a class "action" represented as "A". Similarly, the word "down" is assigned with a class "action" represented as "A", the word "the" is assigned with a class "others" represented as "O" and the word "laptop" is assigned with a class "begin Component" represented as "BC. Remove_A the_O battery_BC
2. Press_VB and_CC hold_VB the_DT power_NN button_NN to_PP drain_VB residual_JJ electrical_JJ charge_NN from_PP the_DT capacitors_NNS that_DT protect_VB the_DT memory_NN
The generated Noun Phrase is:
a) Press_VB and_CC hold_VB the_DT power_NN button_NN
The output from the classifier module 125 is:
a) Press_A and_O hold_A the_O power_BC button_IC
3. Insert_VB the_DT battery_NN
The generated Noun Phrase is:
a) Insert_VB the_DT battery_NN The output from the classfier module 125 is:
a) Insert_A the_O battery_BC
4. Turn_VB on_PP the_DT laptop_NN
The generated Noun Phrase is:
a) Turn_VB on_PP the_DT laptop_NN
The output from the classifier module 125 is:
Turn_A on_A the_O laptop_BC In an embodiment, the action item determination module 127 determines the action items in the one or more sentences. The action items comprise one or more actions and one or more components on which the one or more actions has to be performed.

The one or more actions and the one or more components determined in each of the one or more sentences wherein each word is assigned with a class is as indicated below.
a) Shut_A down_A the_O laptop_BC
The action identified in aforementioned sentence based on the predefined class is "shut down" and the component identified is "laptop".
b) remove_A the_O battery_BC
The action identified in aforementioned sentence based on the predefined class is "remove" and the component identified is "battery".
c) Press_A and_O hold_A the_O power_BC button_IC
The action identified in aforementioned sentence based on the predefined class is "press", "hold" and the component identified is "power button".
d) Insert_A the_O battery_BC
The action identified in aforementioned sentence based on the predefined class is "insert" and the component identified is "battery".
e) Turn_A on_A the_O laptop_BC—
The action identified in aforementioned sentence based on the predefined class is "turn on" and the component identified is "laptop".

Therefore, for the one or more instructions i.e Shut down the laptop and remove the battery, Press and hold the power button to drain residual electrical charge from the capacitors that protect the memory, Insert the battery and Turn on the laptop which are obtained from the knowledge base for the issue, the action items determined by the action item determination system 103 are as shown below.
1. Shut_A down_A the_O laptop_BC
Action: shut down, Component: laptop
2. Remove_A the_O battery_BC
Action: remove, Component: battery
3. Press_A and_O hold_A the_O power_BC button_IC
Actions: press; hold, Component: power button
4. Insert_A the_O battery_BC
Action: insert, Component: battery
5. Turn_A on_A the_O laptop_BC—
Action: turn on, Component: laptop Exemplary Scenario:
Consider an example wherein there is an electrical fluctuation and hence a threat for one or more computers in the environment. An automated system 105 would sense the issue and would obtain the solutions from the knowledge base. But the automated system 105 may not be able to interpret the action items in the solution in order to overcome the issue quickly. Hence the present disclosure suggests associating the action item determination system 103 with the automated system 105. The action item determination system 103 obtains the solutions or the instructions which are in the natural text format from the knowledge base. The solution obtained from the knowledge base is "shut down the computer". The action item determination system 103 determines the action items from the solution.

The action items comprise actions and components. The action determined is "shut down" and the component determined is "computer". The action items determination system 103 provides the action items to the automated system 105. The automated system 105 executes the action items and hence overcomes the issue.

Figure 3:
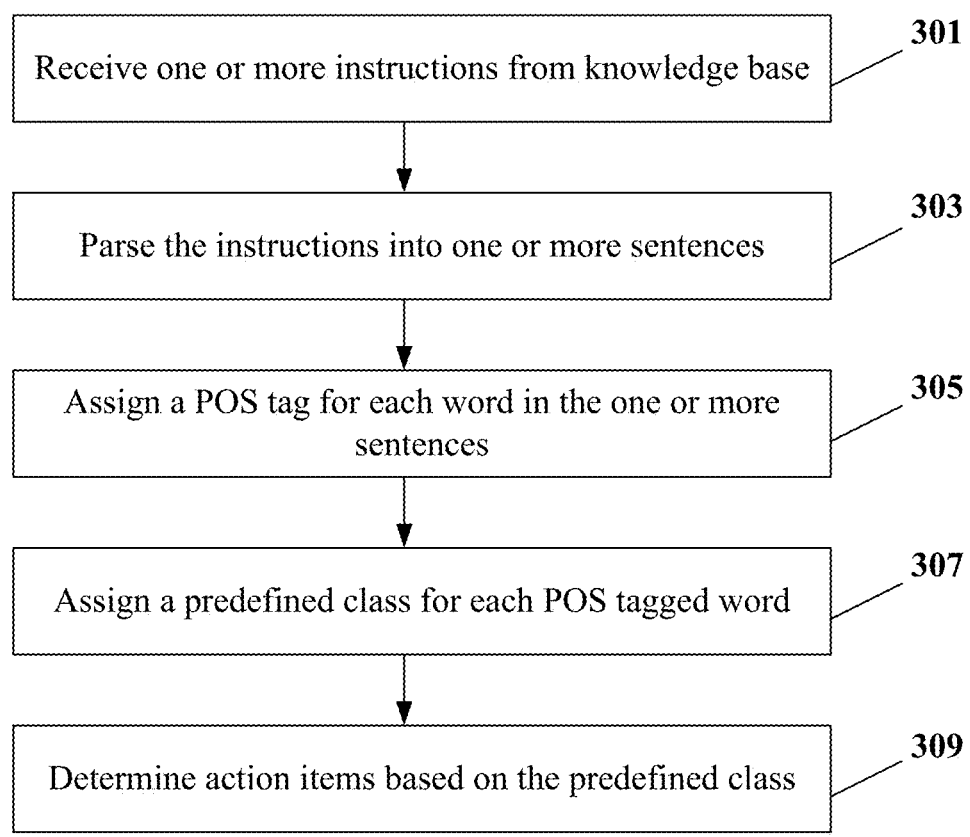
FIG. 3 shows a flowchart illustrating a method of determining action items for execution of one or more operations.

FIG. 3 shows a flowchart illustrating a method for valuating an automation for a process of an enterprise system with some embodiments of the present disclosure.

As illustrated in FIG. 3, the method comprises one or more blocks for determining action items for executing one or more operations using an action item determination system 103. The method may be described in the general context of computer executable instructions. Generally, computer executable instructions can include routines, programs, objects, components, data structures, procedures, modules, and functions, which perform particular functions or implement particular abstract data types.

The order in which the method is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the action item determination system 103 receives one or more instructions from a knowledge base. The one or more instructions are in natural text format. The knowledge base is a document in the form of a user manual or a troubleshooting guide wherein the document may comprise sequence of issues and solutions for those issues.

At block 303, the action item determination system 103 parses the one or more instructions into one or more sentences, prior to parsing the instructions into one or more sentences, the one or more instructions are parsed into one or more steps.

At block 305, the action item determination system 103 assigns a predefined class for each of the POS tagged word. The predefined class is based on POS tag of a target word, POS tag of two words prior to the target word and word embedding of the target word. The predefined class is one of "action", "begin component", "inside component" and "others.

At block 307, the action item determination system 103 determines the action items for the one or more sentences based on the predefined class. The action items comprise one or more actions and one or more components on which the one or more actions has to be performed.

The action item determination system 103 provides the action items to an automated system 105 the automated system 105 performs one or more operations based on the action items.

Computer System

Figure 4:
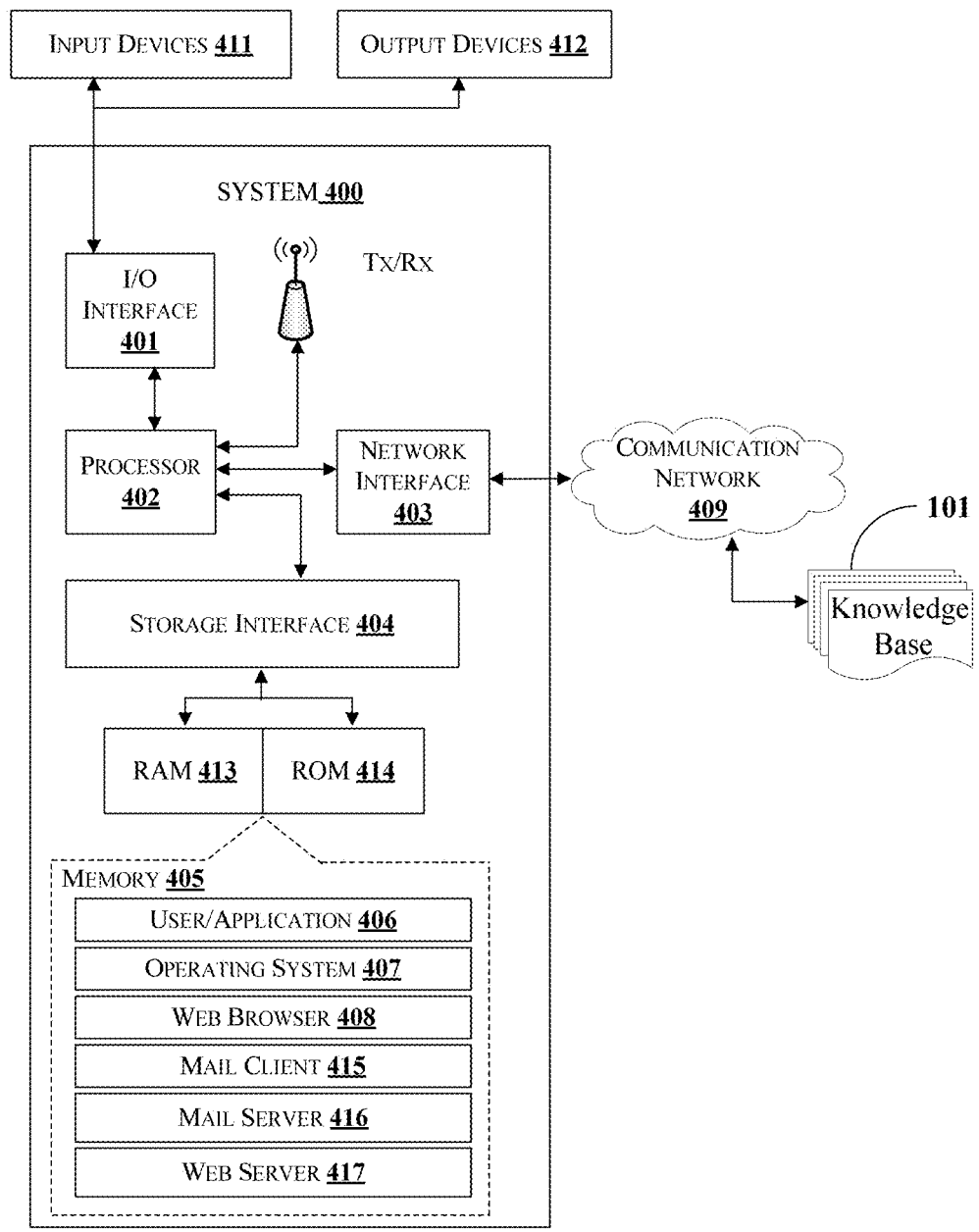
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 can be the action item determination system which is used for determining action items for execution of one or more operations. The computer system 400 may comprise a central processing unit ("CPU" or "processor") 402. The processor 402 may comprise at least one data processor for executing program components for executing user- or system-generated business processes. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 401, the computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application data 406, an operating system 407, web browser 408 etc. In some embodiments, computer system 400 may store user/application data 406, such as the data, variables, records, etc. as described in this disclosure. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, Net BSD, Open BSD, etc.), Linux distributions (e.g., Red Hat, Ubuntu, K-Ubuntu, etc.), International Business Machines (IBM) OS/2, Microsoft Windows (XP, Vista/

7/8, etc.), Apple iOS, Google Android, Blackberry Operating System (OS), or the like. I/O interface 401 may facilitate display, execution, interaction, manipulation, or operation of program components through textual or graphical facilities. For example, I/O interface may provide computer interaction interface elements on a display system operatively connected to the computer system 400, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, the computer system 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein.

In an embodiment, the present disclosure provides a method and system for determining action items for execution of operations.

In an embodiment, the present disclosure enables an automated system to quickly act on an issue based on the action items.

In an embodiment, the present disclosure translates the natural language text in the knowledge base into a format which is easily comprehendible by an automated system to execute one or more operations.

In an embodiment, the present disclosure determines actions and components in a sentence based on their semantic interpretations across multiple domains.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the disclosure.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the present disclosure are intended to be illustrative, but not limiting, of the scope of the disclosure, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for determining action items from a knowledge base for execution of operations, the method implemented by a computing device and comprising:

receiving one or more instructions present in a knowledge base, wherein the one or more instructions are required to execute one or more operations;

automated parsing of each of the one or more instructions into one or more sentences;

automated tagging each of one or more words in the one or more sentences with one of a plurality of Part of Speech (POS) tags;

assigning with a neural network classifier one of a plurality of classes for each of the POS tagged words in the one or more sentences based on one or more predefined parameters, wherein the plurality of classes are all different from the plurality of POS tags and the plurality of classes comprise at least an identified action and an identified component;

determining one or more computer system executable action items in each of the one or more sentences based on the assigned one of the plurality of classes for each of the POS tagged words for executing the one or more operations; and providing the determined one or more computer system executable action items to an automated system to execute.

2. The method as claimed in claim 1, wherein the one or more predefined parameters comprise the POS tag for a target one of the words in each of the one or more sentences, the POS tag for two of the words prior to the target word, or a word embedding of the target word.

3. The method as claimed in claim 1, further comprising selectively generating one or more noun phrases for the one or more sentences comprising the POS tagged words prior to the assigning the one of the plurality of classes to each of the POS tagged words.

4. The method as claimed in claim 1, wherein each of the one or more instructions are in a natural text format.

5. The method as claimed in claim 1, wherein the assigned one of the plurality of classes is one of an action, a begin component, or an inside component.

6. The method as claimed in claim 1, wherein the action items comprise one or more actions to be performed and corresponding one or more components on which the one or more actions are to be performed.

7. An action item determination computing device comprising a memory comprising programmed instructions stored thereon, the memory coupled to one or more processors that are configured to be capable of executing the stored programmed instructions to:

receive one or more instructions present in a knowledge base, wherein the one or more instructions are required to execute one or more operations;

automated parse of each of the one or more instructions into one or more sentences;

automated tag each of one or more words in the one or more sentences with one of a plurality of Part of Speech (POS) tags;

assign with a neural network classifier one of a plurality of classes for each of the POS tagged words in the one or more sentences based on one or more predefined parameters, wherein the plurality of classes are all different from the plurality of POS tags and the plurality of classes comprise at least an identified action and an identified component;

determine one or more computer system executable action items in each of the one or more sentences based on the assigned one of the plurality of classes for each of the POS tagged words for executing the one or more operations; and provide the determined one or more actions computer system executable action items to an automated system to execute.

8. The action item determination computing device as claimed in claim 7, wherein the one or more predefined parameters comprise the POS tag for a target one of the words in each of the one or more sentences, the POS tag for two of the words prior to the target word, or a word embedding of the target word.

9. The action item determination computing device as claimed in claim 7, wherein the one or more processors are further configured to be capable of executing the stored programmed instructions to selectively generate one or more noun phrases for the one or more sentences comprising the POS tagged words prior to the assigning the predefined class one of the plurality of classes to each of the POS tagged words.

10. The action item determination computing device as claimed in claim 7, wherein each of the one or more instructions are in a natural text format.

11. The action item determination computing device as claimed in claim 7, wherein the assigned one of the plurality of classes is one of an action, a begin component, or an inside component.

12. The action item determination computing device as claimed in claim 7, wherein the action items comprise one or more actions to be performed and corresponding one or more components on which the one or more actions are to be performed.

13. A non-transitory computer readable medium having stored thereon instructions for determining action items from a knowledge base for execution of operations that, when executed by one or more processors, cause the one or more processors to:

receive one or more instructions present in a knowledge base, wherein the one or more instructions are required to execute one or more operations;

automated parse of each of the one or more instructions into one or more sentences;

automated tag each of one or more words in the one or more sentences with one of a plurality of Part of Speech (POS) tags;

assign with a neural network classifier one of a plurality of classes for each of the POS tagged words in the one or more sentences based on one or more predefined parameters, wherein the plurality of classes are all different from the plurality of POS tags and the plurality of classes comprise at least an identified action and an identified component;

determine one or more computer system executable action items in each of the one or more sentences based on the assigned one of the plurality of classes for each of the POS tagged words for executing the one or more operations; and provide the determined one or more computer system executable action items to an automated system to execute.

14. The non-transitory computer readable medium as claimed in claim 13, wherein the one or more predefined parameters comprise the POS tag for a target one of the words in each of the one or more sentences, the POS tag for two of the words prior to the target word, or a word embedding of the target word.

15. The non-transitory computer readable medium as claimed in claim 13, wherein the programmed instructions, when executed by the one or more processors, further cause the one or more processors to selectively generate one or more noun phrases for the one or more sentences comprising the POS tagged words prior to the assigning the one of the plurality of classes to each of the POS tagged words.

16. The non-transitory computer readable medium as claimed in claim 13, wherein each of the one or more instructions are in a natural text format.

17. The non-transitory computer readable medium as claimed in claim 13, wherein the assigned one of the plurality of classes is one of an action, a begin component, or an inside component.

18. The non-transitory computer readable medium as claimed in claim 13, wherein the action items comprise one or more actions to be performed and corresponding one or more components on which the one or more actions are to be performed.

* * * * *